No. 613,557. Patented Nov. 1, 1898.
K. BULAND.
SHAFT OR TONGUE COUPLING.
(Application filed Aug. 20, 1898.)
(No Model.)
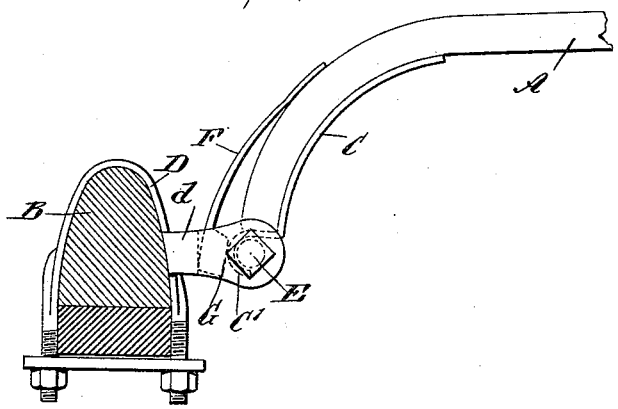
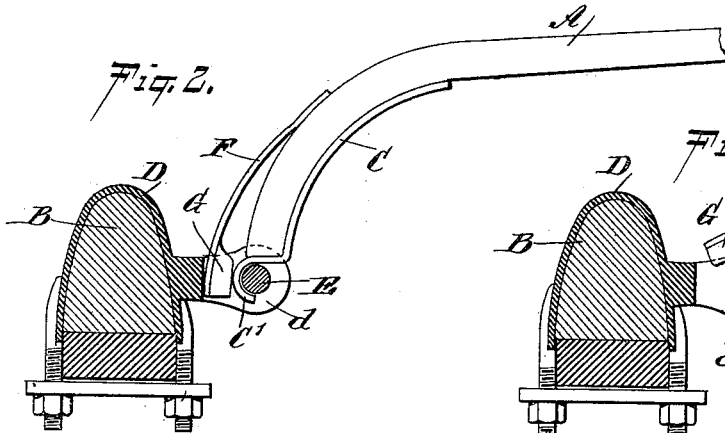 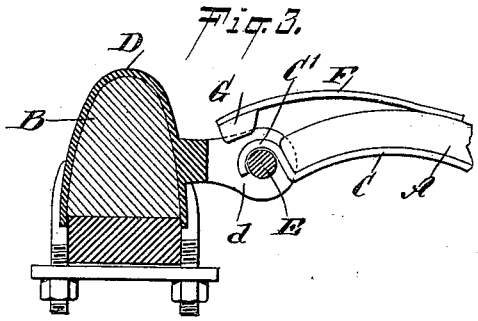
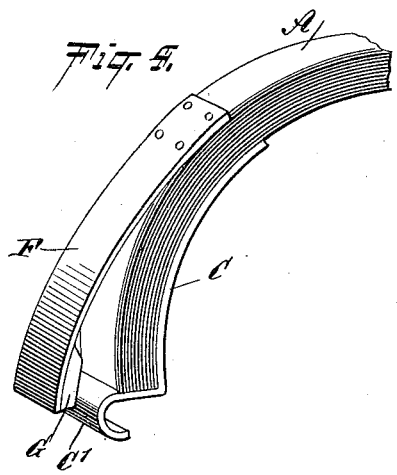
WITNESSES:
William P. Goebel.
H. L. Reynolds.
INVENTOR
K. Buland.
BY
ATTORNEYS.

UNITED STATES PATENT OFFICE.

KNUT BULAND, OF LINN GROVE, IOWA.

SHAFT OR TONGUE COUPLING.

SPECIFICATION forming part of Letters Patent No. 613,557, dated November 1, 1898.

Application filed August 20, 1898. Serial No. 689,096. (No model.)

*To all whom it may concern:*

Be it known that I, KNUT BULAND, of Linn Grove, in the county of Buena Vista and State of Iowa, have invented a new and Improved Shaft or Tongue Coupling, of which the following is a full, clear, and exact description.

My invention relates to an improvement in devices for attaching shafts and tongues to carriages, and comprises the novel features hereinafter described and claimed.

Reference is to be had to the accompanying drawings, forming a part of this specification, in which similar characters of reference indicate corresponding parts in all the views.

Figure 1 is a side elevation of my device, showing the axle in section. Fig. 2 is a similar view, the support for one end of the pivot-pin being removed. Fig. 3 is a similar view showing the shaft in its lowered position or ready to be removed, and Fig. 4 is a perspective view showing the rear end of the shaft.

The object of my invention is to produce a shaft and tongue coupling which will enable the shaft or tongue to be quickly removed from a carriage and another one substituted in its place. This is attained by attaching to the rear end of the shaft or tongue a forwardly-facing hook, which is adapted to engage a pivot-pin, and locking the hook in position by attaching to the shaft a spring-held block adapted to fill the space between the pivot-pin and the axle when the shaft or tongue is raised, thus preventing the hook from being disengaged until the shaft or tongue has been dropped to such a position as to remove the block.

In the drawings one end only of a shaft has been shown. This, however, fully illustrates the construction of the device and its manner of attachment, as it is immaterial whether the device is applied to a shaft or a tongue. In the drawings the axle is represented in section at B, and upon the axle is secured a clip D, which in the main is of ordinary construction, but is provided in addition with two forwardly-extending arms $d$. The forward ends of these arms are connected by a horizontal pivot-pin E, which may be made as a part of the clip or as a bolt which is inserted in the arms.

To the under side of the shaft A is secured a bar C, of iron, which at its rear end is provided with a forwardly-facing hook $C'$, adapted to snugly fit about the pivot-pin E. Upon the upper rear side of the shaft A is secured a spring bar or plate F, which at its lower end supports a block G. The block G is of such a size as to substantially fill the space between the rear side of the hook $C'$ and the body of the clip or the backing immediately in the rear of the pivot-pin. It is evident that when the shaft is in the position shown in Figs. 1 and 2 the hook cannot be freed from the pivot-pin, as the block will not permit the hook to move backward sufficiently to clear the pin. If, however, the shaft is dropped into the position shown in Fig. 3, the hook may then be cleared from the shaft.

The spring F when the shaft is in place presses against the clip and holds the hook snugly against the pivot-pin, thus preventing rattling. When it is desired to remove the shafts or tongues which are provided with my device, it is only necessary to drop the forward ends thereof, when the hooks may be easily removed. In the reverse manner a second set may be quickly inserted.

This device enables a change to be made very quickly, and yet holds the shaft or tongue firmly in place, besides preventing rattling. It is also very cheap in construction and not likely to get out of order.

Having thus described my invention, I claim as new and desire to secure by Letters Patent—

1. A shaft and tongue coupling for carriages, comprising shaft-pivots supported from the carriage and consisting of pivot-pins supported a short distance in front of a backing, forwardly-facing hooks upon the rear ends of the shafts, adapted to engage the pivot-pins, springs upon the shafts, and locking-blocks carried by the springs and adapted to enter and fill the space between the hook and the backing when the shafts are raised to working position, and to be withdrawn therefrom when the shafts are lowered.

2. A shaft and tongue coupling for carriages, comprising a clip adapted to be secured to the axle and having forwardly-projecting arms and a horizontal pivot passing through the arms, a forwardly-facing hook secured to the shaft and adapted to engage the pivot-pin, a spring upon the shaft, and a block carried by the spring and adapted to enter and fill the space between the hook and clip when the shaft is raised to working position, and to be thrown up and out of said space when the shaft is lowered.

3. A shaft and tongue coupling for carriages, comprising a clip adapted to be secured to the axle and having forwardly-projecting arms, a horizontal pivot passing through the arms, a forwardly-facing hook secured to the shaft and adapted to engage the pivot-pin, a spring-bar secured to the upper side of the shaft, and a block carried upon the rear end of the spring-bar and adapted to enter and fill the space between the hook and clip when the shaft is raised to working position, and to be drawn upward and out of said space when the shaft is lowered.

KNUT BULAND.

Witnesses:
BENJAMIN BULAND,
AUFIN LARSON.